United States Patent
Ryu et al.

(10) Patent No.: US 11,731,268 B2
(45) Date of Patent: Aug. 22, 2023

(54) HYPER ELASTIC SOFT GROWING ROBOT

(71) Applicant: KOREA ADVANCED INSTITUTE OF SCIENCE AND TECHNOLOGY, Daejeon (KR)

(72) Inventors: Jee Hwan Ryu, Daejeon (KR); Nam Gyun Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/541,729

(22) Filed: Dec. 3, 2021

(65) Prior Publication Data

US 2023/0173666 A1  Jun. 8, 2023

(51) Int. Cl.
*B25J 9/14* (2006.01)

(52) U.S. Cl.
CPC ..................... *B25J 9/142* (2013.01)

(58) Field of Classification Search
CPC ............ B25J 9/142; B25J 18/02; B25J 18/06
See application file for complete search history.

(56) References Cited

U.S. PATENT DOCUMENTS

| | | | | |
|---|---|---|---|---|
| 2003/0168068 A1* | 9/2003 | Poole | .................. | A61B 1/00154 128/850 |
| 2016/0263751 A1* | 9/2016 | Galloway | ............ | B25J 15/0023 |
| 2019/0032684 A1* | 1/2019 | Kowalewski | ............ | B25J 18/06 |
| 2019/0217908 A1* | 7/2019 | Hawkes | .................. | F01B 19/04 |
| 2020/0198123 A1* | 6/2020 | Cobb | ........................ | B25J 9/026 |
| 2021/0354289 A1* | 11/2021 | Hawkes | .................. | B25J 9/142 |
| 2022/0355468 A1* | 11/2022 | Coad | ........................ | B25J 18/06 |

FOREIGN PATENT DOCUMENTS

| | | | | |
|---|---|---|---|---|
| CN | 110450138 A | * | 11/2019 | |
| CN | 110450149 A | * | 11/2019 | ............ B25J 9/0009 |
| CN | 113103212 A | * | 7/2021 | ......... B25J 15/0408 |
| FR | 3017166 A1 | * | 8/2015 | ............. B25J 9/142 |
| KR | 20190095653 A | * | 8/2019 | |

* cited by examiner

*Primary Examiner* — Joseph Brown
(74) *Attorney, Agent, or Firm* — Hauptman Ham, LLP

(57) ABSTRACT

Provided is a soft growing robot which may be precisely controlled by reducing the effect of a tail tension applied to its inner periphery. The soft growing robot includes a case having one open side; and a vine including an outer periphery having one end fixed to one side surface of the case, the inner periphery disposed inside the outer periphery while being spaced apart from the outer periphery and extended into the case, a tip connecting the other end of the outer periphery and one end of the inner periphery to each other, and a tip space formed by the outer periphery, the tip and the inner periphery, and a tip space formed by the outer periphery, the tip and the inner periphery. A diameter of the tip is smaller than a diameter of the outer periphery to a bent portion between the tip and the outer periphery.

20 Claims, 19 Drawing Sheets

[FIG. 1]
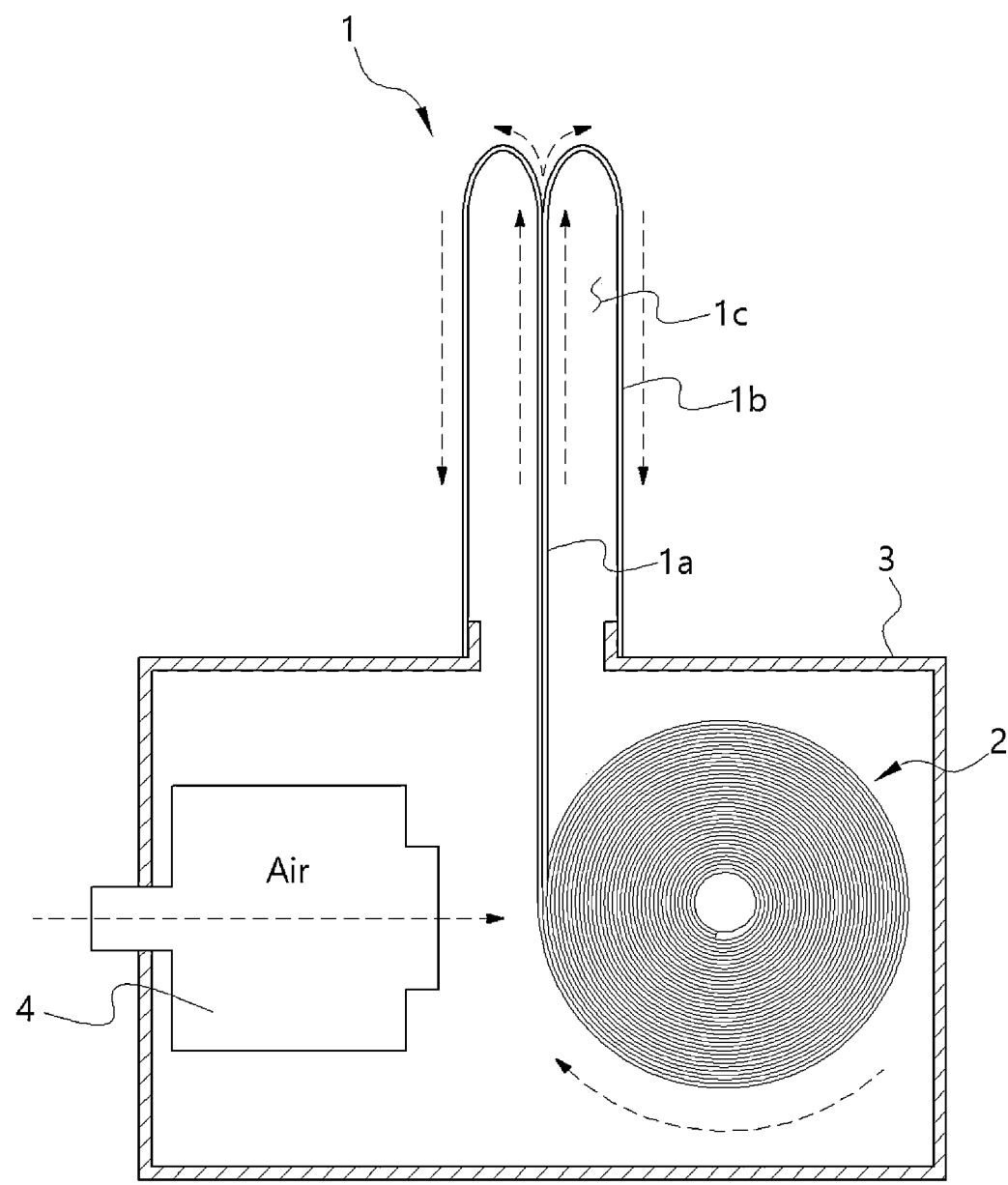
PRIOR ART

[FIG. 2]
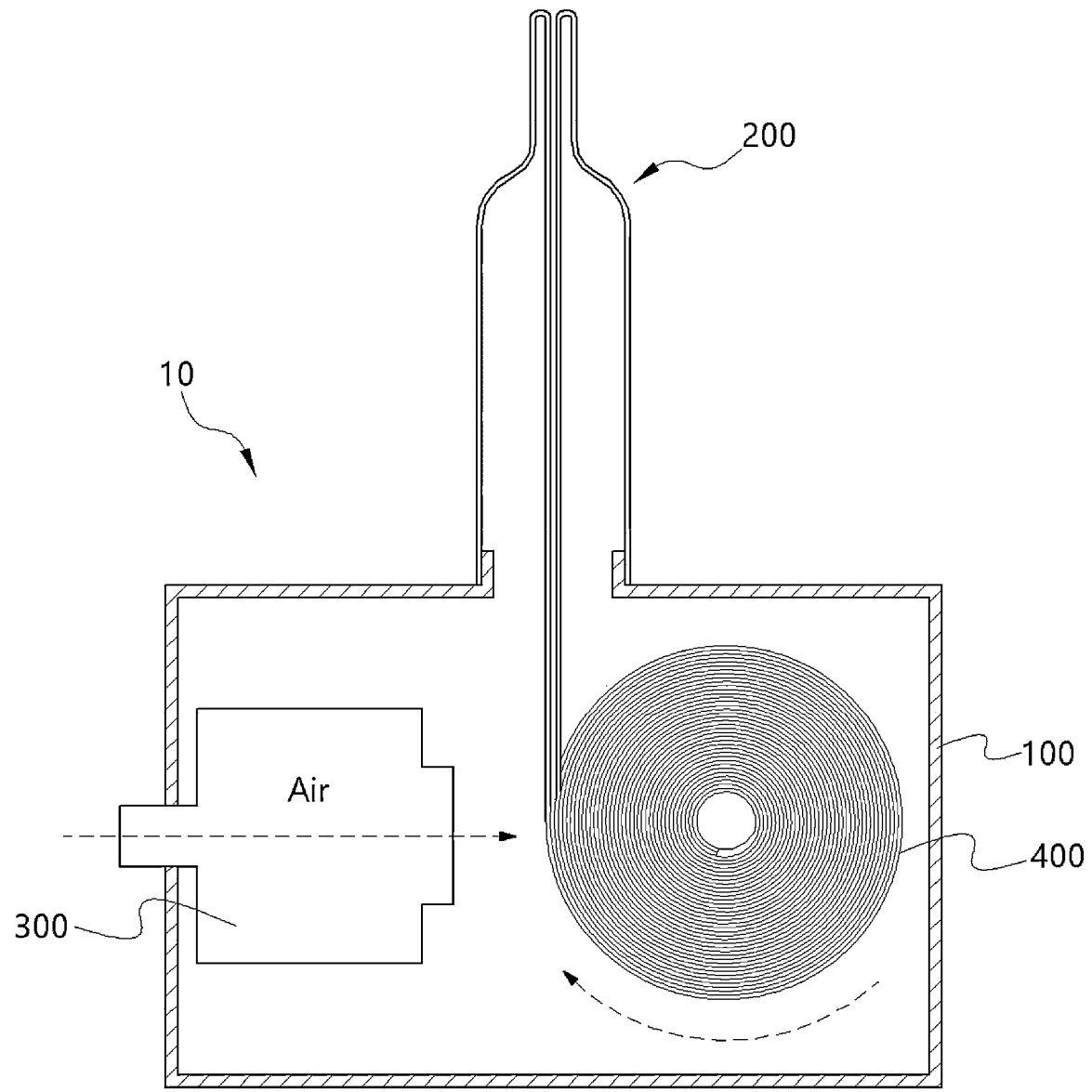

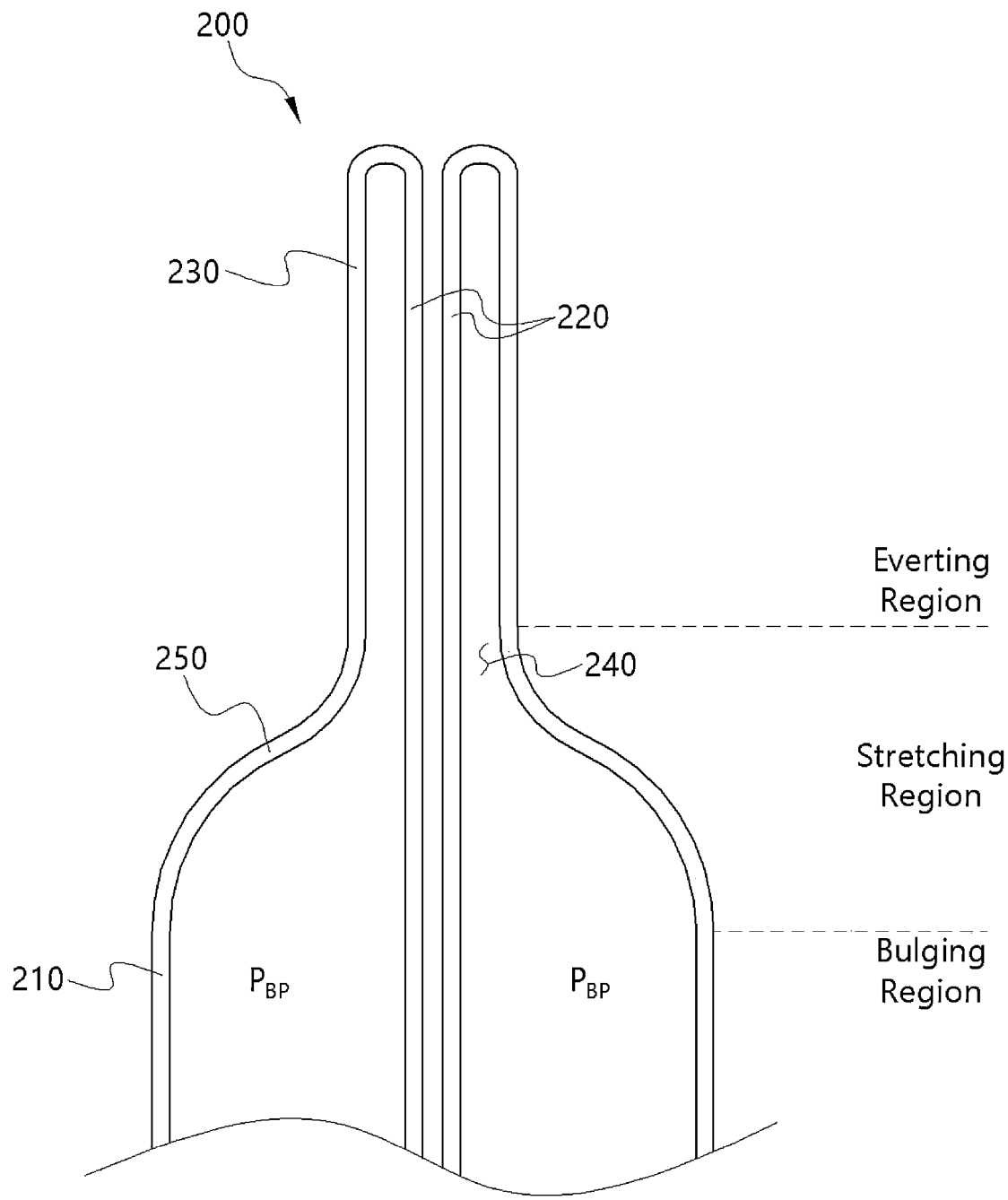
[FIG. 3]

[FIG. 4]
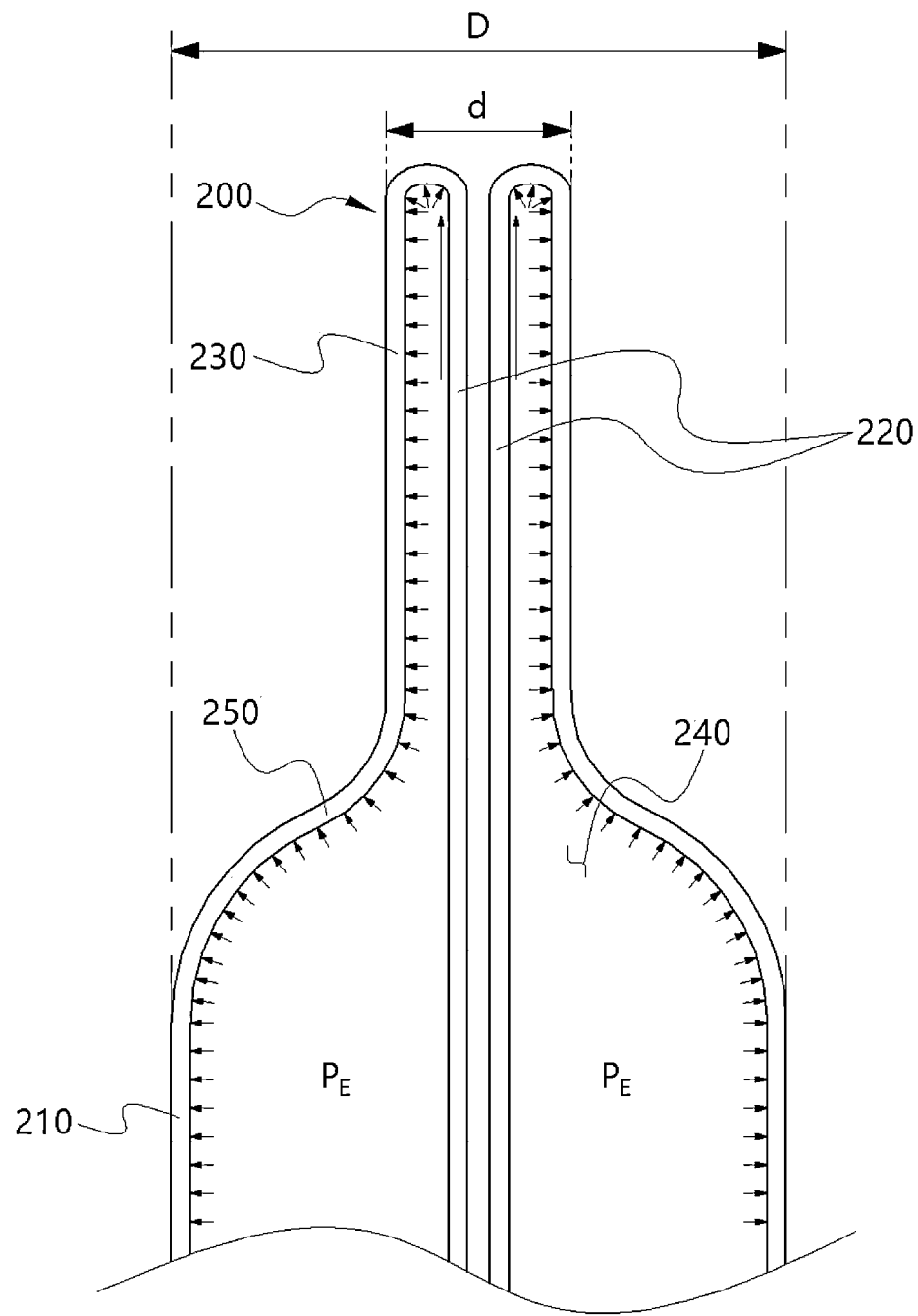

[FIG. 5]
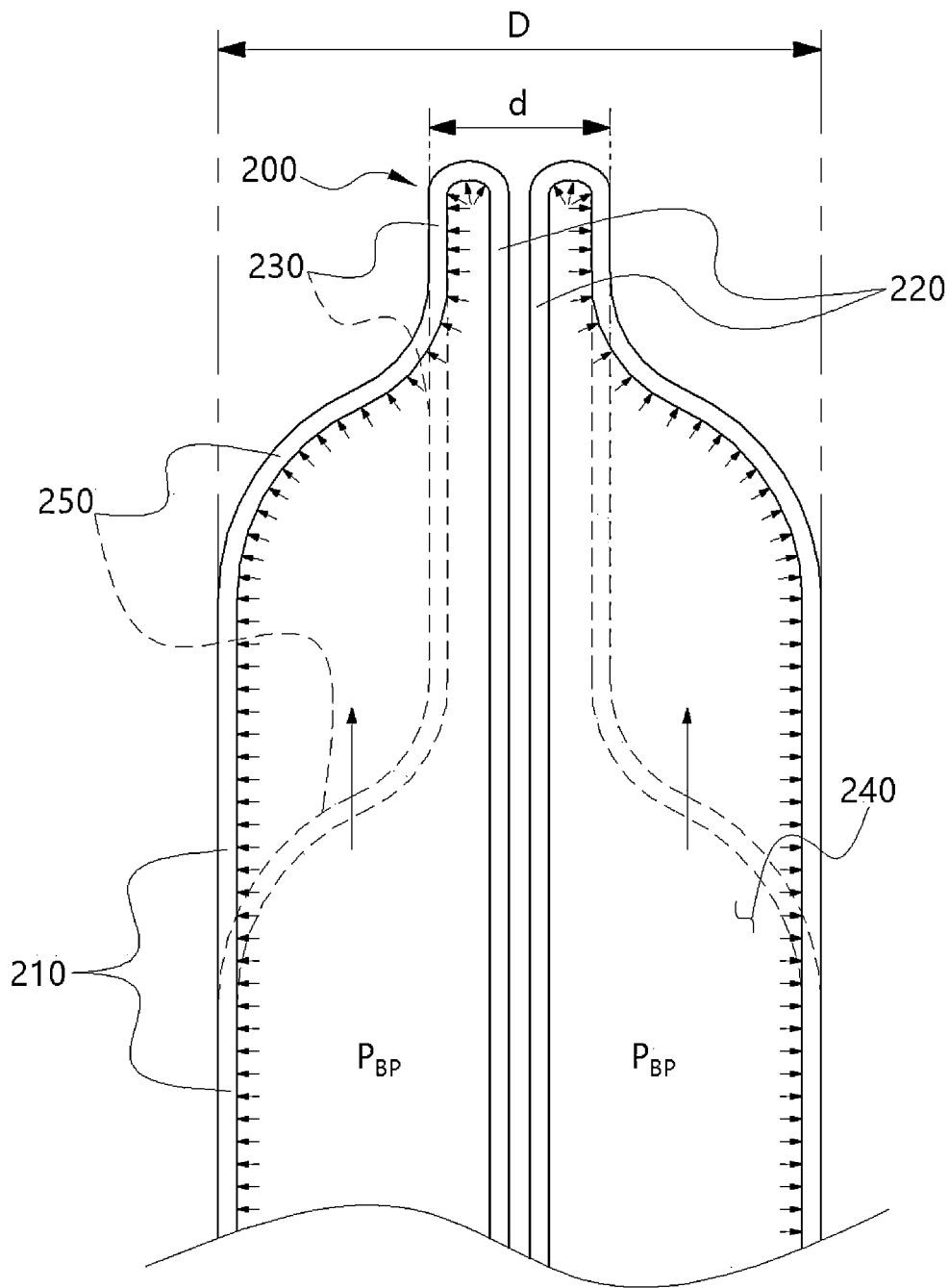

[FIG. 6]
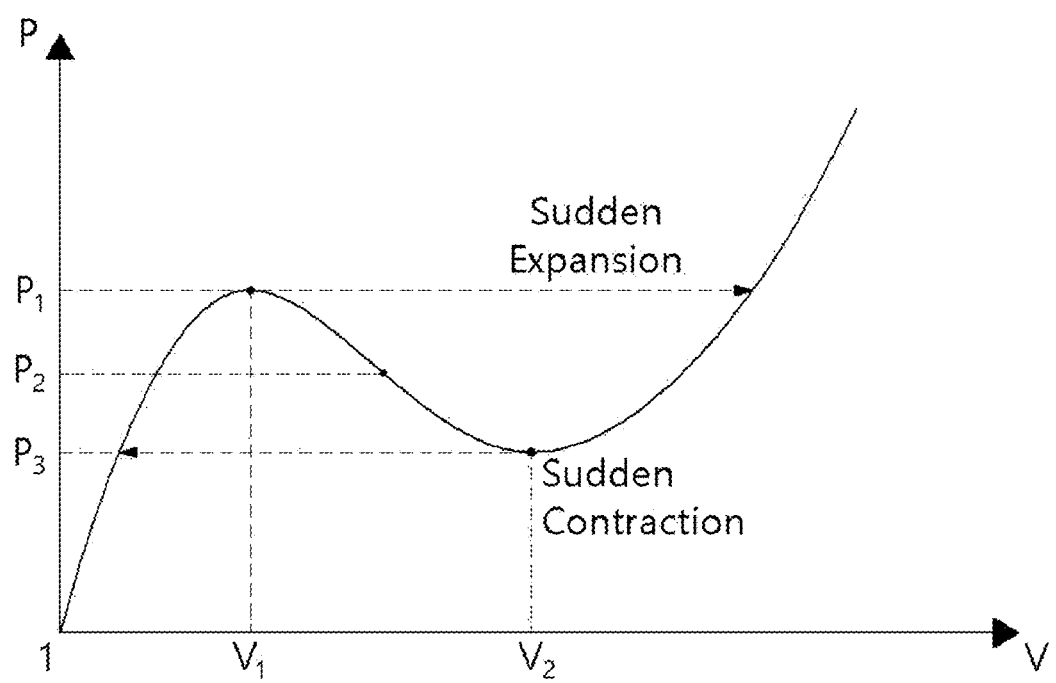

[FIG. 7]
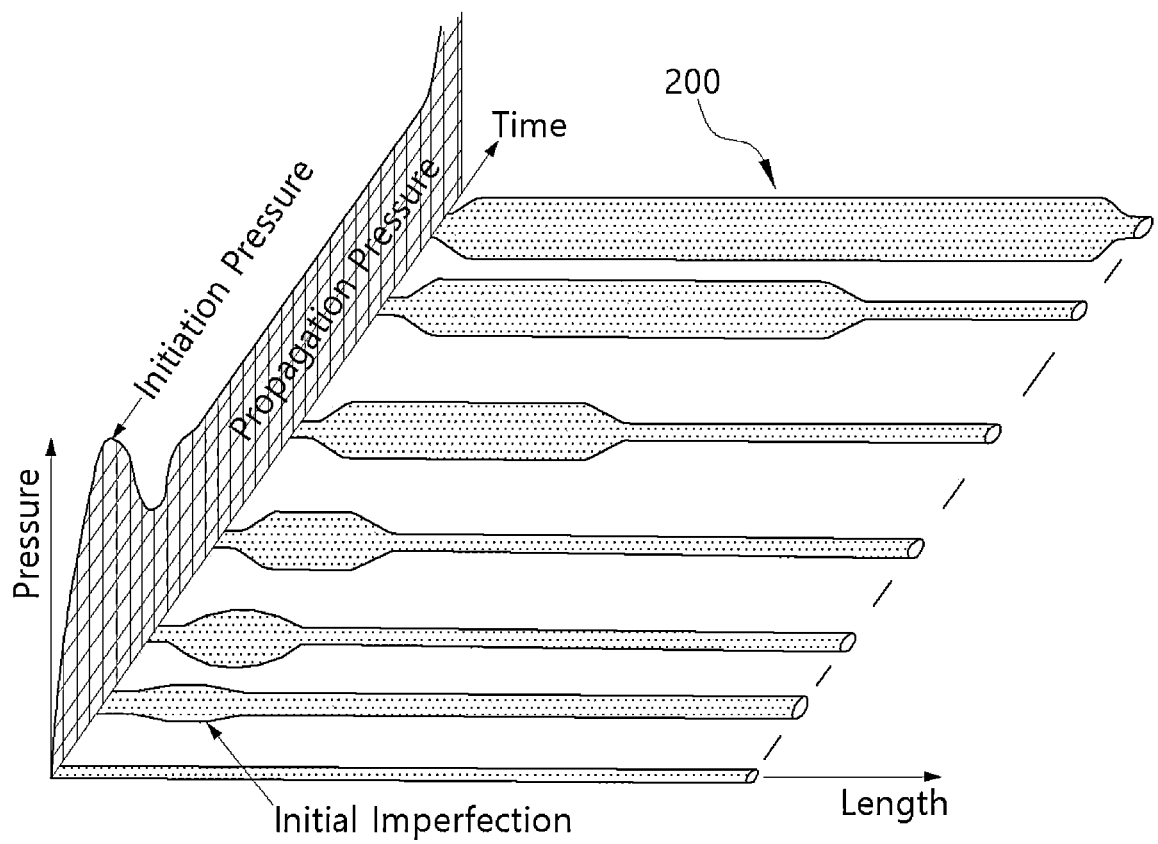

[FIG. 8]
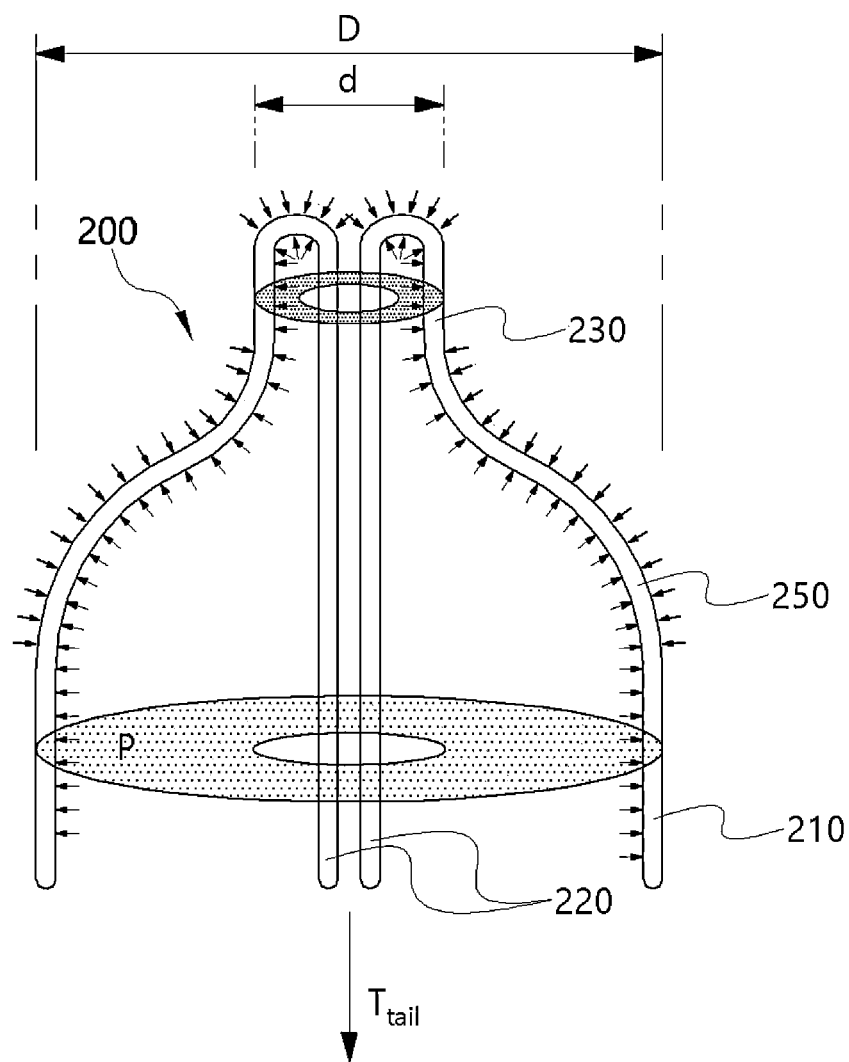

[FIG. 9]
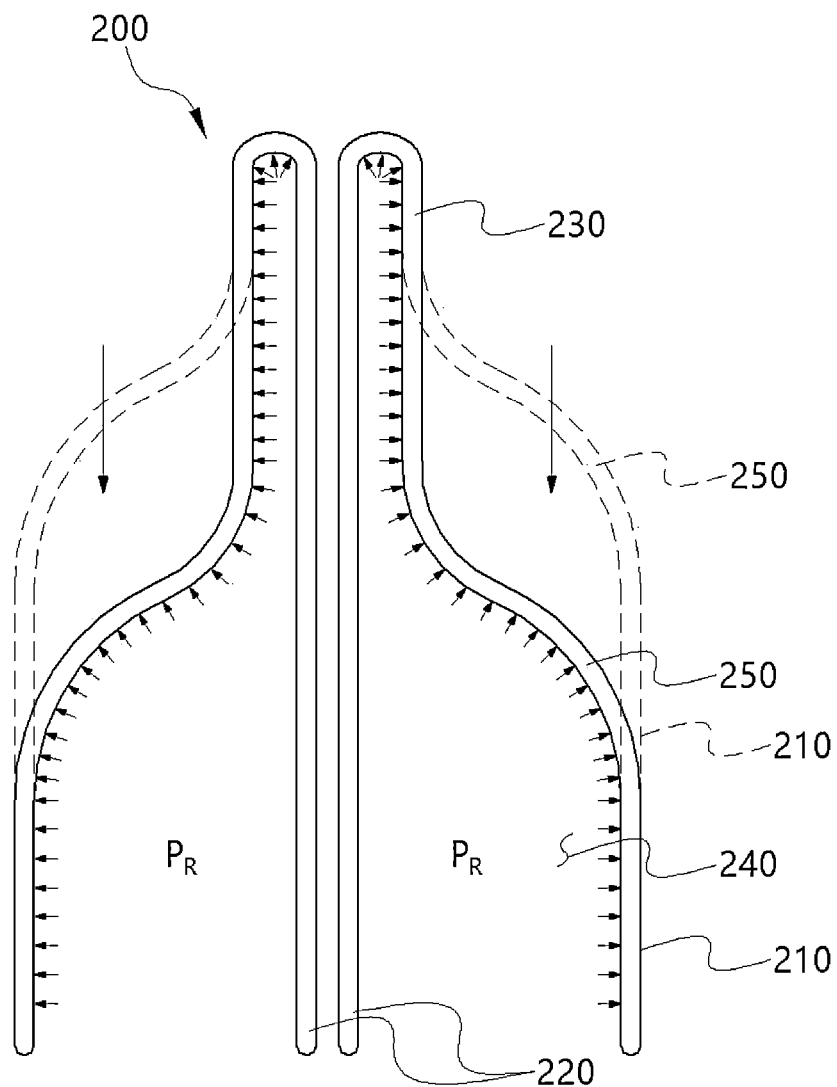

[FIG. 10]
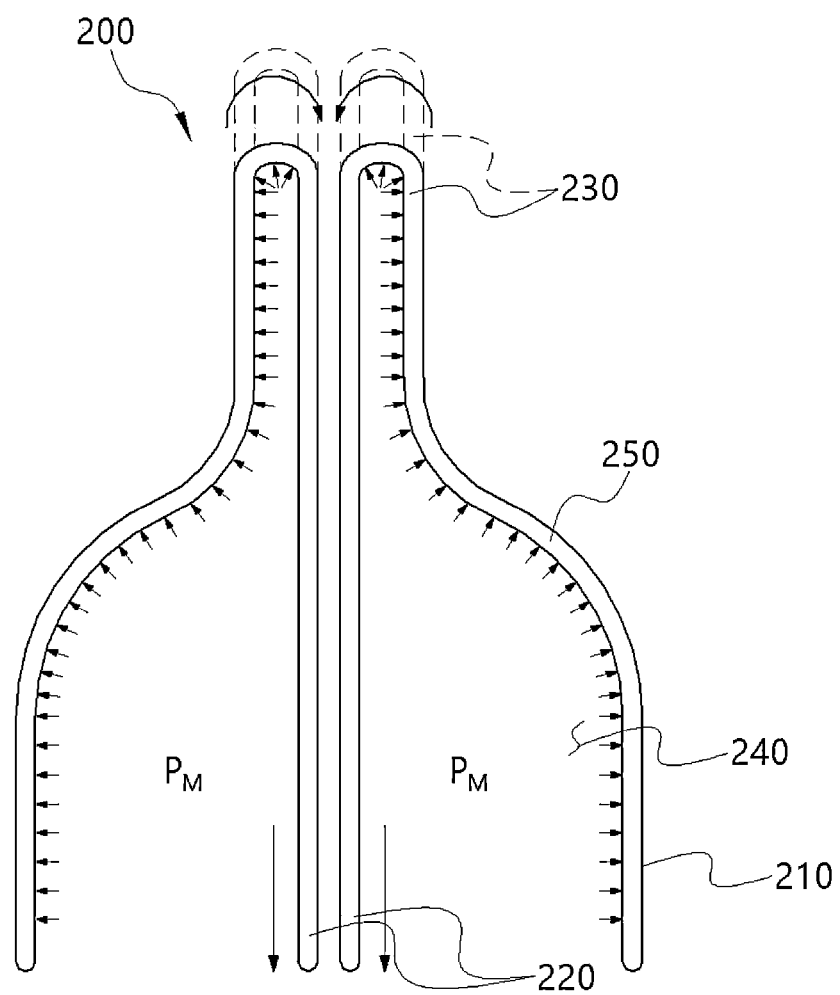

[FIG. 11]
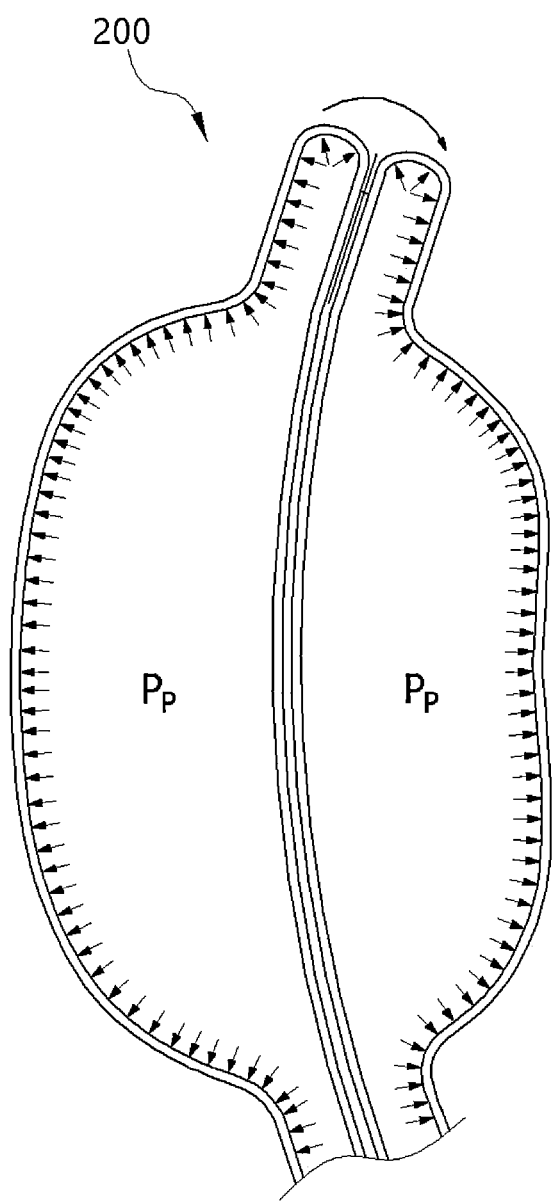

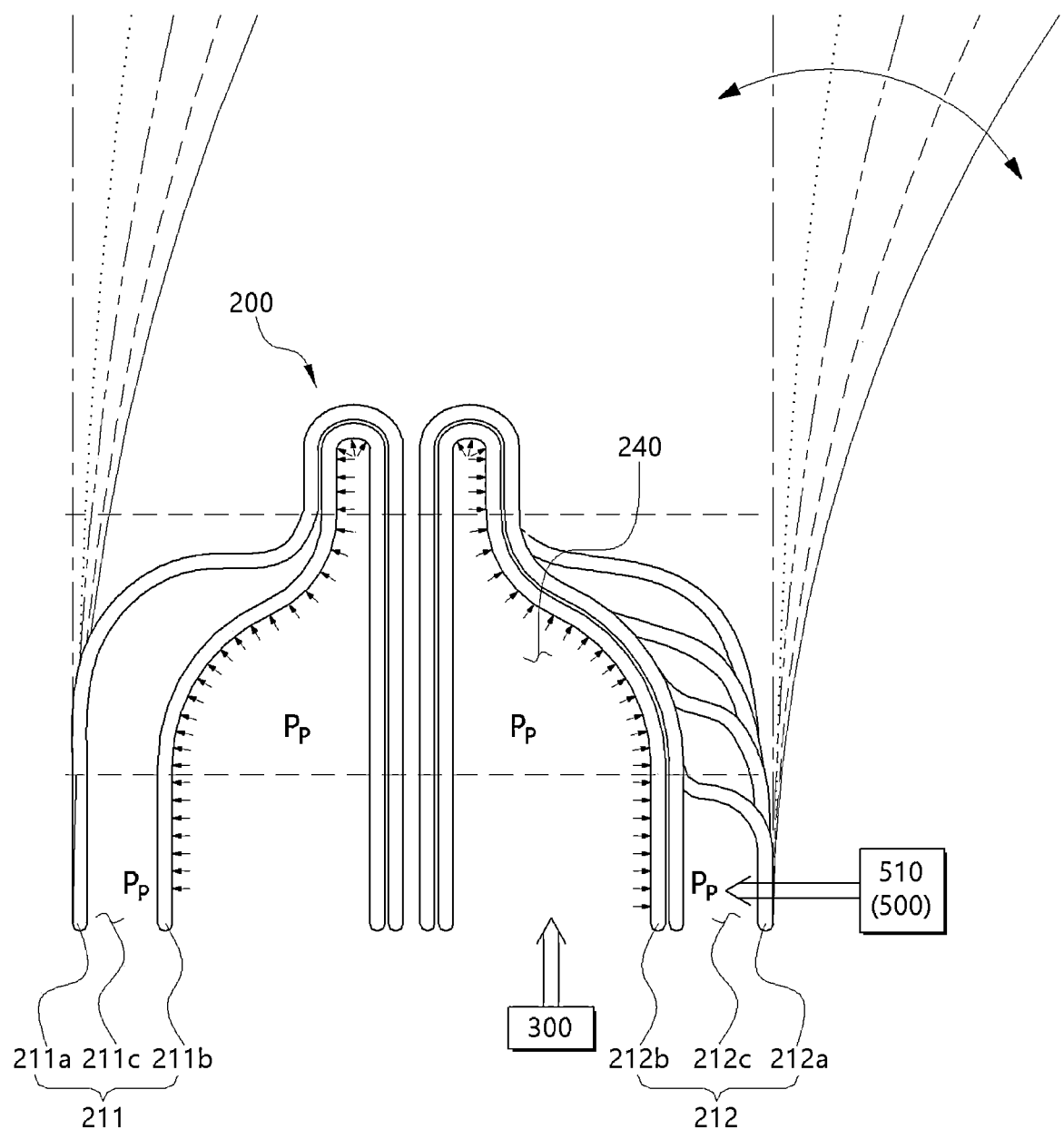

[FIG. 13]
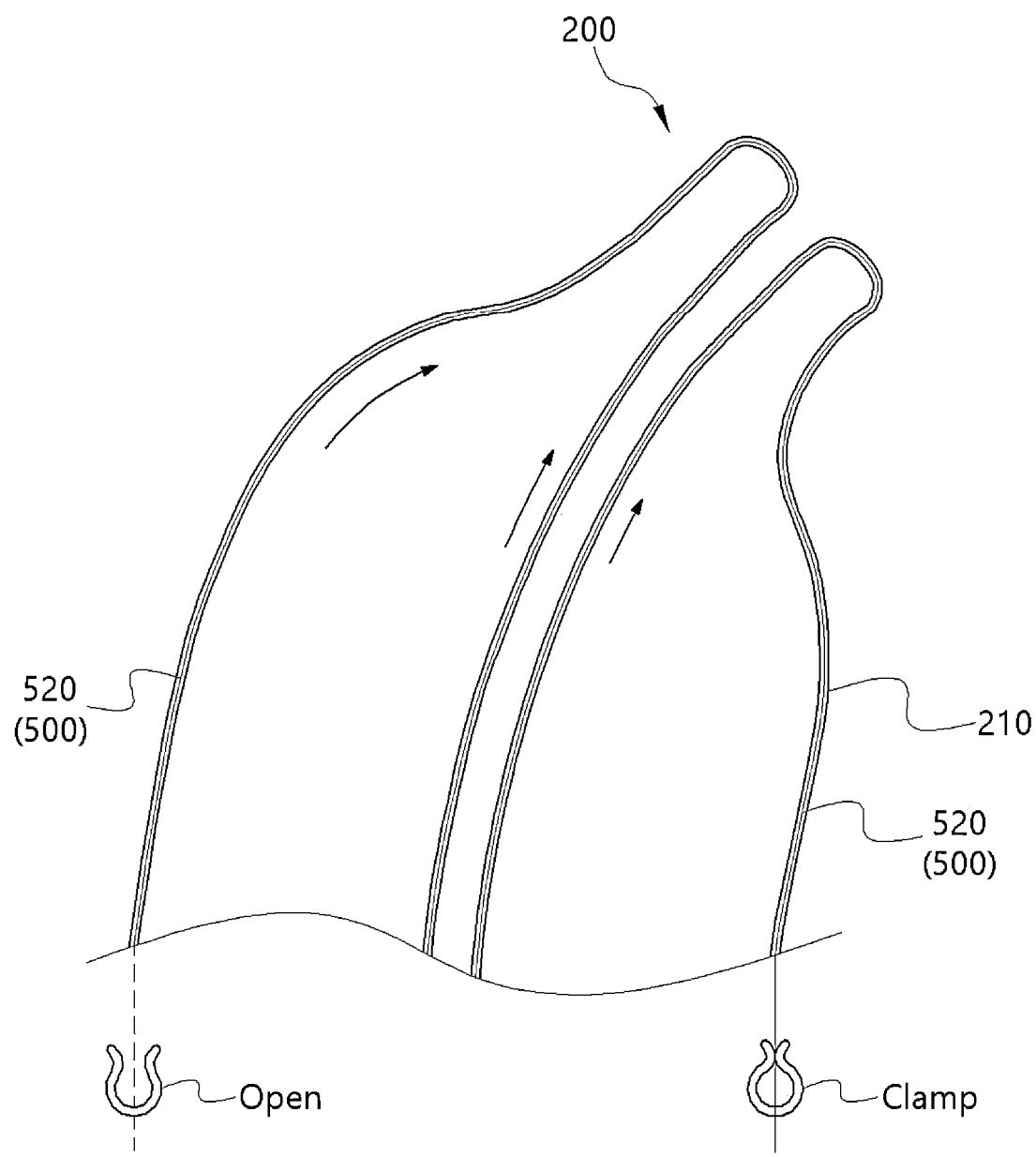

[FIG. 14]
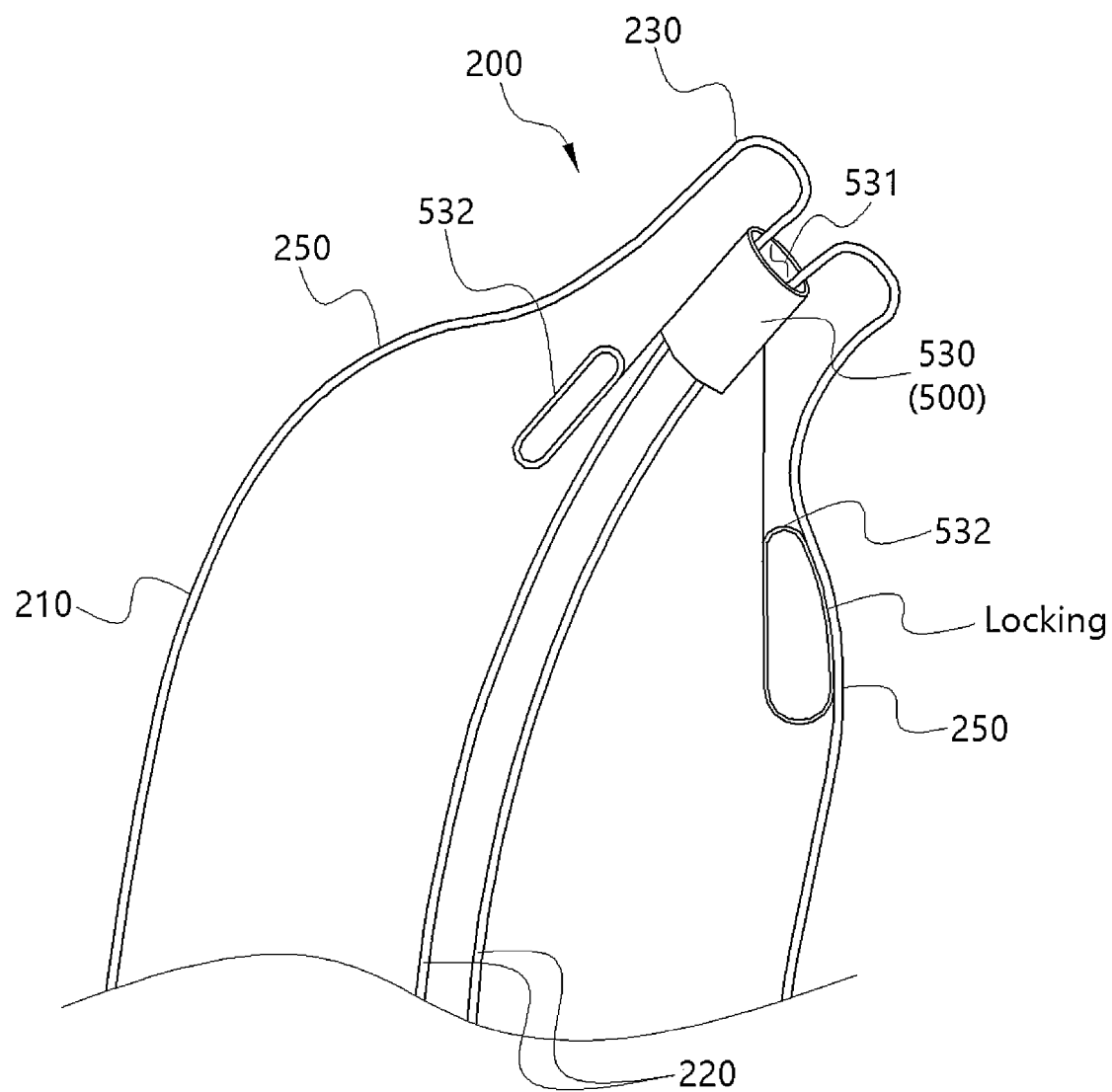

[FIG. 15]
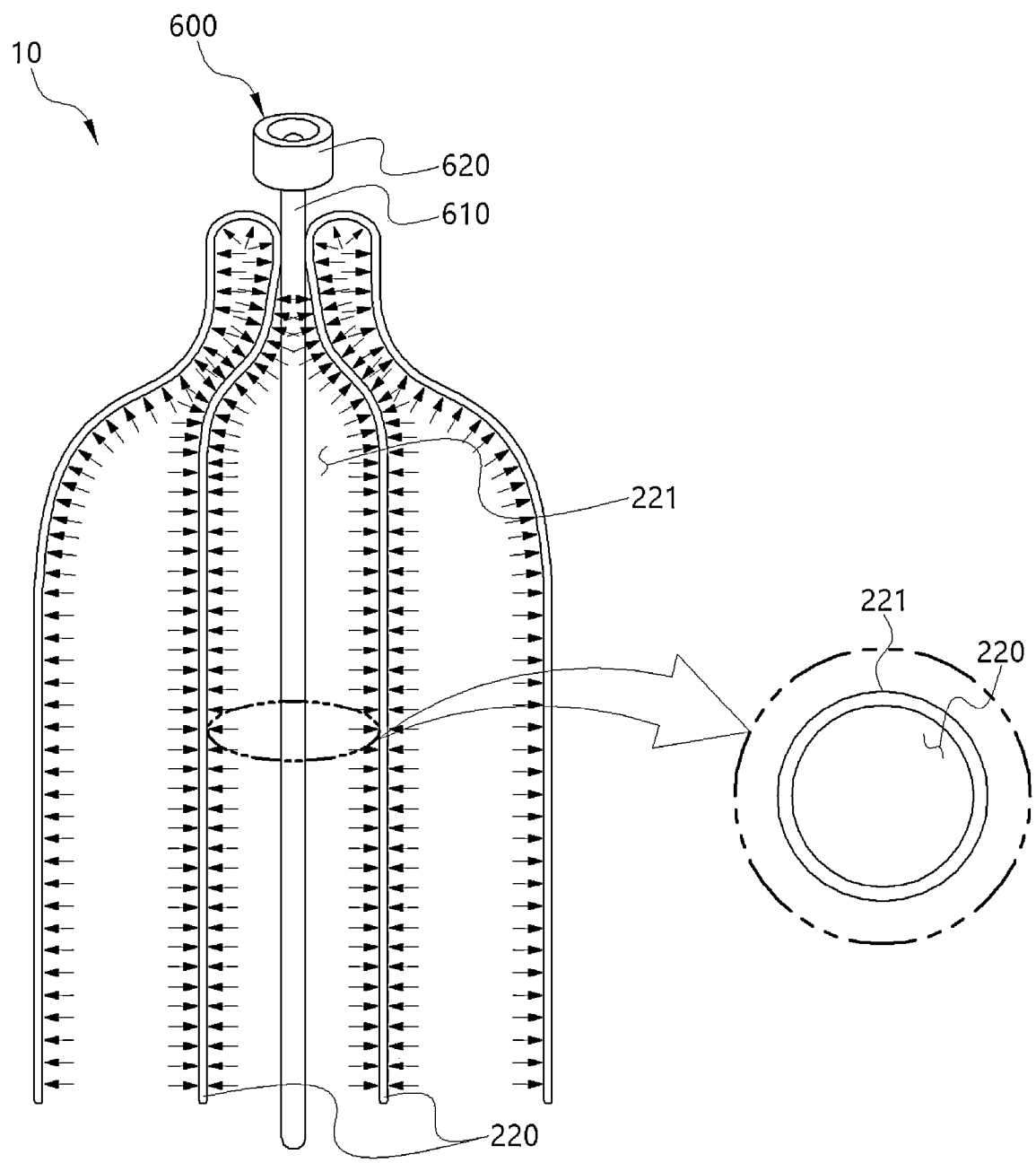

[FIG. 16]
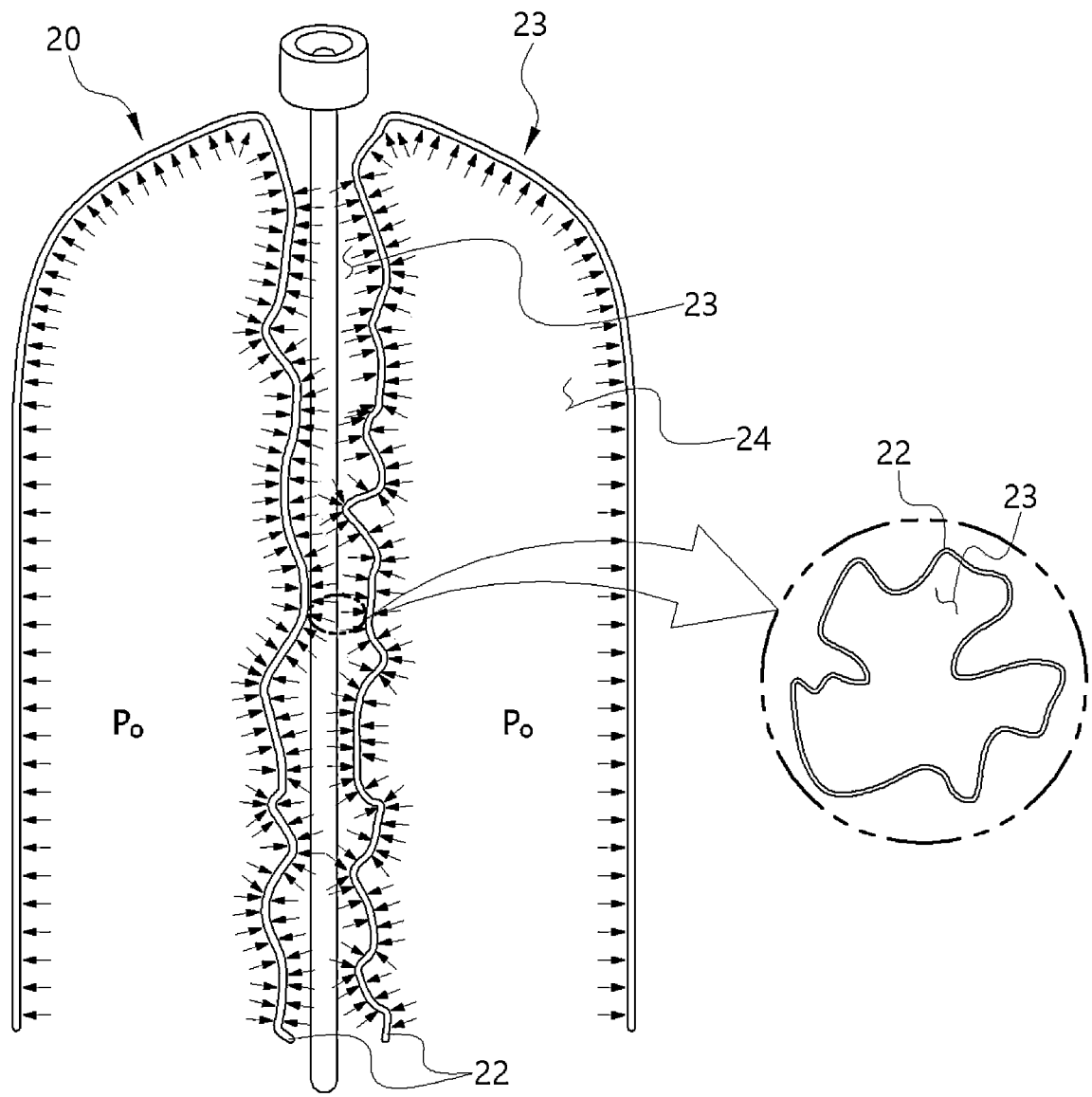

[FIG. 17]
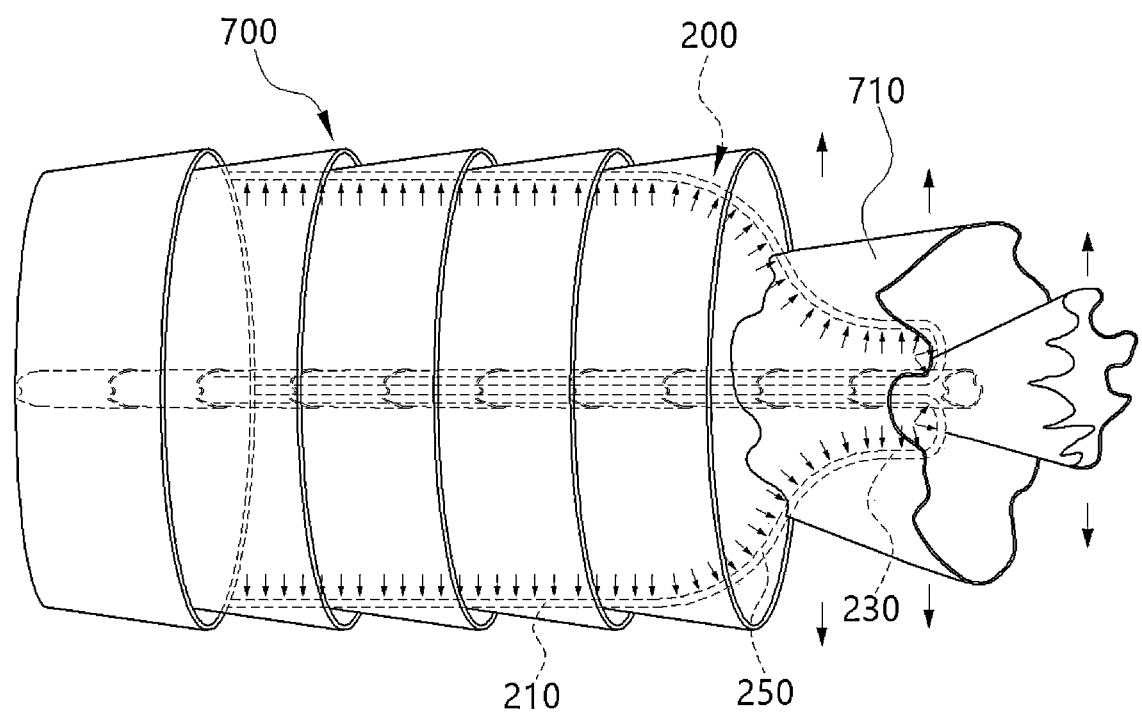

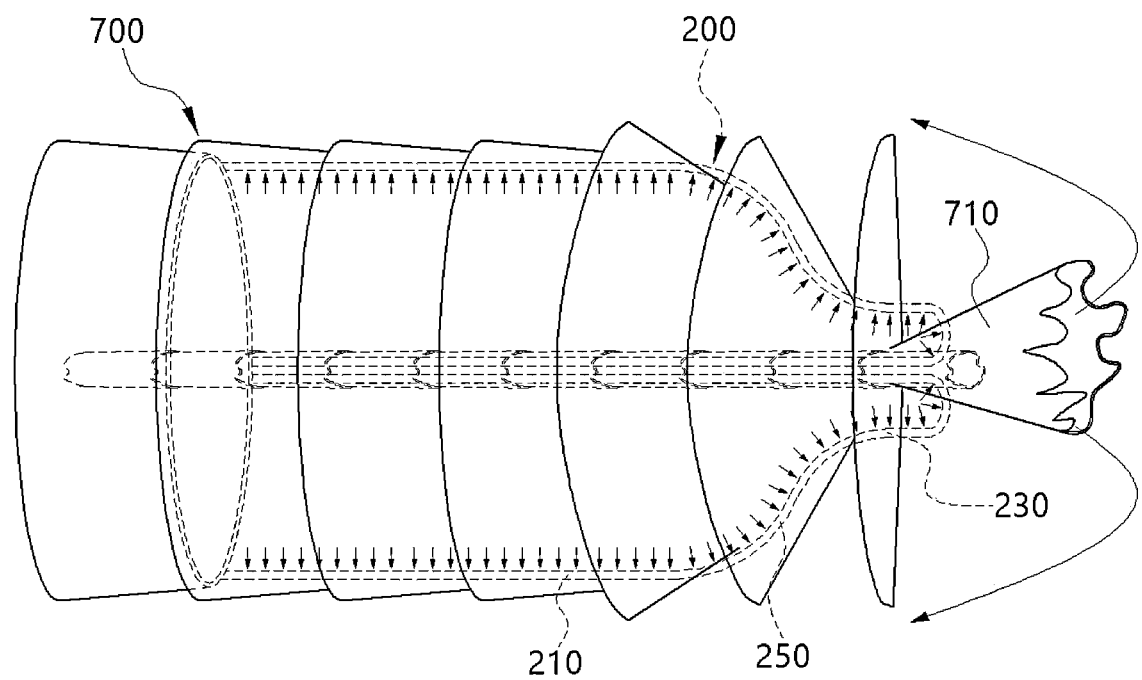
[FIG. 18]

[FIG. 19]
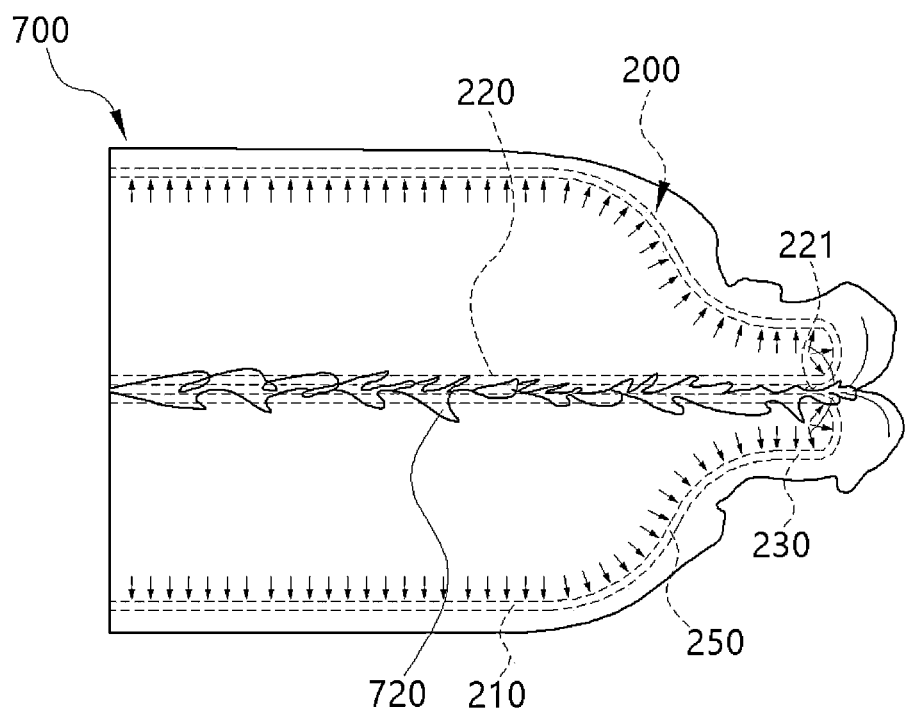

HYPER ELASTIC SOFT GROWING ROBOT

TECHNICAL FIELD

The following disclosure relates to a hyper-elastic soft growing robot, and more particularly, to a hyper-elastic soft growing robot which may be extended forward by pneumatic and bulged to have a large body by using a small volume of material.

BACKGROUND

Various types of mobile robots are being developed to perform various inspections, maintenance/repair works, life-saving activities or the like after moving to a specific destination on behalf of a person in a situation where the person cannot reach the destination, such as inside a hollow pipe, in a pile of debris from a collapsed building, etc. A conventional mobile robot may have a shape of a vehicle body equipped with a crawler, and have a camera, a tool for the maintenance work and the like mounted thereto. Alternatively, the conventional mobile robot may have a shape of a hose or the like that is long in a longitudinal direction, and may move by applying a movement principle of a caterpillar thereto. Here, the crawler-type robot may move smoothly on a flat surface, and may have difficulty moving on a stepped portion, or in a vertical or inclined direction. In addition, the robot to which the movement principle of the caterpillar is applied may have a limited usage because this robot has difficulty moving in various curved paths such as curved, T-shaped, Y-shaped branches, etc.

Accordingly, in order to compensate for the above-mentioned shortcomings, a recent document such as US 2021-0354289 A1 discloses a soft robot, i.e. vine robot, a tip of which may be grown. As shown in FIG. 1, the vine robot may include a vine 1, a feeder 2, a case 3 and a pressure controller 4. Here, the vine 1 may have an inner periphery 1a and an outer periphery 1b, and may be controlled to be expanded or retreated by a pressure of a tip space 1c between the inner periphery 1a and the outer periphery 1b and to change its growth direction by using a separate actuator.

The vine robot may be three-dimensionally operated when compared to that of the prior art, and is thus recently spotlighted as the most popular technology. However, the currently disclosed vine robot has a limitation in that the robot may only be grown by operating the inner periphery 1a and the outer periphery 1b, and the vine 1 grown to a predetermined length or more may be retracted by being buckled. In addition, another method is necessary for the vine 1 to have a locked shape, and it is thus difficult to manufacture the vine robot.

SUMMARY

Technical Problem

An exemplary embodiment of the present disclosure is directed to providing a hyper-elastic soft growing robot which has a tip at its front end, the tip having a smaller diameter than an outer periphery thereof, to minimize the effect of a tail tension applied to an inner periphery thereof.

Technical tasks of the present disclosure are not limited to those mentioned above, and other tasks not mentioned here may be obviously understood by those skilled in the art from the following description.

Technical Solution

In one general aspect, a soft growing robot includes: a case having one open side; and a vine including an outer periphery having one end fixed to one side surface of the case, an inner periphery disposed inside the outer periphery while being spaced apart from the outer periphery and extended into the case, a tip connecting the other end of the outer periphery and one end of the inner periphery to each other, and a tip space formed by the outer periphery, the tip and the inner periphery, wherein a diameter of the tip is smaller than a diameter of the outer periphery, thereby forming a bent portion between the tip and the outer periphery.

In addition, the soft growing robot may further include a pressure controller that controls a pressure in the tip space.

In addition, the vine may be made of a hyper elastic material.

In addition, the vine may have the tip space formed by a first pressure during its growth, and then have its growth state controlled by a second pressure lower than the first pressure.

In addition, the tip have the increased growth length when the vine is grown.

In addition, the vine includes a stretching region bent between the tip and the outer periphery, and the tip or the stretching region may be bulged to expand the outer periphery when the vine is grown.

In addition, an everting region in which the tip is disposed may be reduced when the vine is grown.

In addition, the soft growing robot may further include a feeder connected to the other end of the inner periphery of the vine to control an entire length of the vine.

In addition, the soft growing robot may further include a steering mechanism that controls a growth direction of the vine.

In addition, the outer periphery of the vine may include a plurality of voids disposed in a circumferential direction thereof, and the steering mechanism may control the plurality of voids by pressures different from each other.

In addition, when fluid is injected into the tip space, the growth direction of the vine may be changed to face a void having a relatively low pressure among the plurality of voids.

In addition, the outer periphery of the vine may include an outer wall, an inner wall and the void between the outer wall and the inner wall.

In addition, the steering mechanism may include a plurality of tendons inserted into the outer periphery of the vine.

In addition, the steering mechanism may include one or more fixing parts that limit expansion of a specific portion of the vine.

In addition, the steering mechanism may include a mount inserted into the tip space in the tip and including a through hole into which the inner periphery of the vine is inserted, one end of the fixing part may be connected to the mount, and the other end of the fixing part may be in contact with and fixed to the vine.

In addition, the bent portion may be formed between the tip and the outer periphery, and the other end of the fixing part may be in contact with the bent portion.

In addition, the fixing part may be in contact with an outer surface of the vine to limit the expansion of the vine.

In addition, the soft growing robot may further include a cover surrounding an outer circumferential surface of the vine.

In addition, when the vine is grown, the cover disposed in a folded state may be unfolded.

In addition, the cover may be partially inserted into a center formed by the inner periphery of the vine.

In addition, the soft growing robot may further include a data collection unit including a cable extended along the center formed by the inner periphery of the vine, and a sensing module connected to the cable to obtain external information.

Advantageous Effects

As set forth above, according to the present disclosure, the soft growing robot made of the hyper elastic material may be bulged to have a very large body by using a small volume of material. Accordingly, the robot may have the locking characteristic while having the increased growth length, and may thus have the locked shape.

In addition, the hyper-elastic soft growing robot according to the present disclosure may significantly reduce the effect of the tail tension, may thus prevent a problem caused by its buckling in advance, and may be easily manufactured to be used in more diverse industries.

The effects of the present disclosure are not limited to the above-mentioned effects, and other effects that are not mentioned may be obviously understood by those skilled in the art from the claims.

BRIEF DESCRIPTION OF THE DRAWINGS

FIG. 1 is a view showing a structure of a conventional vine robot.

FIG. 2 is a view showing a structure of a soft growing robot according to the present disclosure.

FIG. 3 is a view showing a structure of a vine according to the present disclosure.

FIGS. 4 and 5 are views each showing that the vine is grown according to the present disclosure.

FIG. 6 is a graph showing a characteristic of a hyper elastic material according to the present disclosure.

FIG. 7 is a view schematically showing that the vine is expanded according to the present disclosure.

FIG. 8 is a view showing a tension applied to the vine according to the present disclosure.

FIGS. 9 and 10 are views each showing that the vine is retracted according to the present disclosure.

FIG. 11 is a view showing a locking characteristic of the vine according to the present disclosure.

FIG. 12 is a view showing a stiffness adjuster-type steering mechanism according to a first exemplary embodiment of the present disclosure.

FIG. 13 is a view showing a tendon-type steering mechanism according to a second exemplary embodiment of the present disclosure.

FIG. 14 is a view showing a mount-type steering mechanism according to a third exemplary embodiment of the present disclosure.

FIGS. 15 and 16 are views each showing centers of the vines according to the present disclosure and the prior art.

FIG. 17 is a view showing an unfolded-type cover according to a fourth exemplary embodiment of the present disclosure.

FIG. 18 is a view showing an everted-type cover according to a fifth exemplary embodiment of the present disclosure.

FIG. 19 is a view showing a shared growth-type cover according to a sixth exemplary embodiment of the present disclosure.

DETAILED DESCRIPTION OF EMBODIMENTS

Hereinafter, a soft growing robot according to various exemplary embodiments of the present disclosure will be described in detail with reference to the accompanying drawings. The accompanying drawings below are provided by way of example so that the idea of the present disclosure may be sufficiently transferred to those skilled in the art to which the present disclosure pertains. Therefore, the present disclosure is not limited to the accompanying drawings provided below, but may be implemented in another form. In addition, like reference numerals denote like elements throughout the specification.

Technical terms and scientific terms used in the present specification have the general meaning understood by those skilled in the art to which the present disclosure pertains unless otherwise defined, and a description for the known function and configuration unnecessarily obscuring the gist of the present disclosure will be omitted in the following description and the accompanying drawings.

FIGS. 2 to 5 are drawings each showing a soft growing robot according to the present disclosure: FIG. 2 is a view showing a structure of the soft growing robot; FIG. 3 is a view showing a structure of a vine; and FIGS. 4 and 5 are views each showing that the vine is grown.

Referring to FIG. 2, a soft growing robot 10 according to the present disclosure may include a case 100, a vine 200, a pressure controller 300 and a feeder 400. Here, the case 100 may be a housing open in one direction for the vine 200 to be disposed to be grown in the one direction of the case 100. In addition, one portion of the vine 200 may be extended into the case 100 and be connected to the feeder 400, and the other portion may be exposed in the one direction of the case 100. Here, the feeder 400 may be a winding feeding drum as shown in the drawing or may have another form such as a folding type, and the feeder 400 may thus be any of various devices which may increase or decrease a length of the vine 200. The pressure controller 300 may be a compressor for example. The vine 200 may be grown when receiving an increased pressure by the pressure controller 300, and the vine 200 may retreat when receiving a decreased pressure by the pressure controller 300. Hereinafter, the following description describes the vine 200 in more detail with reference to the case 100, the pressure controller 300 and the feeder 400, shown in the drawings.

Referring to FIG. 3, the vine 200 may include an outer periphery 210 having one end fixed to one side surface of the case 100, an inner periphery 220 disposed inside the outer periphery 210 while being spaced apart from the outer periphery 210, and extended into the case 100, a tip 230 connecting the other end of the outer periphery 210 and one end of the inner periphery 220 to each other, and a tip space 240 formed by the outer periphery 210, the tip 230 and the inner periphery 220. In addition, as the outer periphery 210 and the tip 230 have diameters different from each other, the vine 200 may further include a bent portion 250 connecting the outer periphery 210 and the tip 230 to each other.

The vine 200 may be made of a hyper elastic material. Accordingly, the outer periphery 210 of the vine 200 may be a bulging region, the bent portion 250 may be a stretching region, and the tip 230 may be an everting region. Here, the everting may indicate an action in which the robot 10 everts its body at the tip 230 by a force induced by a pressure in the tip space 240, and the bulging may indicate an action in which the hyper elastic material is expanded by the pressure in the tip space 240. When controlled in a direction in which the vine 200 is grown, the everting region or the bulging region may be expanded. Here, the everting of the tip 230 and the bulging propagations of the outer periphery 210 and the bent portion 250 may be performed independently of each other, and both of the everting and the bulging may be used when the vine 200 is grown. In addition, the vine 200 may be configured to be first everted and then bulged, or simultaneously everted and bulged.

Referring to the everting action of FIG. 4 and the bulging propagation action of FIG. 5, respectively, the outer periphery 210 of the vine 200 may have a first diameter D, and the tip 230 may have a second diameter d. Here, the first diameter D may be larger than the second diameter d. In addition, the vine 200 has a very small thickness compared to that of the tip space 240. Accordingly, the first diameter D and the second diameter d may be either the inner diameter or the outer diameter of the outer periphery 210 and the tip 230, respectively, and it may be more preferable that the first diameter D and the second diameter d be compared with each other as the inner diameters of the outer periphery 210 and the tip 230. When receiving the increased pressure as fluid is injected thereinto, the tip space 240 may reach an everting pressure (PE), which is a reference pressure at which the everting action is performed, and a bulging propagation pressure (PBP), which is a reference pressure at which the bulging propagation action is performed. Here, the everting pressure (PE) may be lower than or similar to an initiation pressure of the bulging propagation pressure (PBP). Here, the vine 200 is made of the hyper elastic material as described above, and may thus be grown at a lower pressure after the initiation pressure. Here, the initiation pressure may be defined as a first pressure P1, and a pressure applied to the vine 200 during its growth may be defined as a second pressure P2, respectively. More preferably, The fluid may be a gas or water.

FIGS. 6 to 11 are drawings each showing the soft growing robot according to the present disclosure: FIG. 6 is a graph showing a characteristic of a hyper elastic material; FIG. 7 is a view schematically showing that the vine is expanded; FIG. 8 is a view showing a tension applied to the vine; FIGS. 9 and 10 are views each showing that the vine is retracted; and FIG. 11 is a view showing a locking characteristic of the vine.

Referring to FIGS. 6 and 7, the vine 200 may be made of the hyper elastic material a pressure-volume graph of which has an "S"-shaped curve. Accordingly, when reaching the first pressure P1, which is the initiation pressure, the vine 200 may have its volume rapidly expanded, and the volume may also be controlled to reach from a first volume V1 to a second volume V2 even by a pressure lower than the first pressure P1. Here, the second pressure P2 controlling the growth volume of the vine 200 may be higher than a third pressure P3, which is generated between the first volume V1 and the second volume V2 on the graph and is the lowest pressure to control the volume of the vine 200 during its growth. Here, the first pressure P1 and the third pressure P3 may be pressures that generate the sudden expansion or sudden contraction of the vine 200, respectively. As such, the present disclosure may control the time, shape or the like of the growth of the vine 200 by defining a growth state of the vine as the vine is maintained at the second pressure P2, which is a propagation pressure, after the first pressure P1, which is the initiation pressure.

Referring to FIG. 8, a tail tension (Ttail) applied to the inner periphery 220 of the vine 200 may be lowered by the characteristic of the hyper elastic material, the vine 200 may have the characteristic of the hyper elastic material and thus lower the tail tension (Ttail) applied to the inner periphery 220, thereby eliminating the tail tension affecting the robot. In more detail, a maximum wall tension may be exhibited in the outer periphery 210, which is the bulging region. However, the outer periphery 210 has no axial component, and the maximum wall tension does not affect the tail tension. In addition, about half as much tension may be generated in the bent portion 250, which is the stretching region, and a very little wall tension may be generated in the tip 230, which is the everting region. Consequently, only an axial force generated at the tip 230 may have an influence on the tail tension. Even though having the outer periphery of a larger diameter than that of the conventional robot, the robot of the present disclosure may have the lower tail tension as shown in an equation below.

$$T_{tail} = \frac{P\pi d^2}{8} \ll \frac{P\pi D^2}{8}$$

(Here,
P may indicate the pressure in the tip space,
d may indicate the diameter of the tip, and
D may indicate the diameter of the outer periphery).

As the general growing robot is grown through many curves, an angle of its growth curve may be accumulated and a frictional force occurring between the tail and the body may be increased by using the Capstan formula. Eventually, the robot may be no longer grown when reaching a critical accumulated angle. However, the soft growing robot according to the present disclosure may have a small tail tension as the tail tension is determined by the tip 230 as shown in the above equation, and the robot may thus have a high critical accumulated angle, and may continue to be grown regardless of a curvature of the body previously grown. This point may be a very significant advantage because the robot may have multiple curvatures. As such, in the soft growing robot according to the present disclosure, only a very small amount of the tail tension is generated because the wall tension maintains equilibrium with the internal pressure, and unnecessary bending moment caused by the tail tension may thus be reduced. Furthermore, when having the curvature, the robot may be grown longer with the higher curvature by reducing the frictional force occurring by the tail tension.

Referring to FIGS. 9 and 10, a significant amount of the tail tension may have to be applied to the tip 230 to retract the vine 200. However, when the tip 230 includes no hardware, the tail tension applied thereto through the inner periphery 220 may affect the entire body in a process of propagating the force to the tip 230. Moreover, to be retracted without being buckled, the vine 200 may have to maintain its stiffness except for its portion close to the tip. Therefore, currently, there is a demand for an additional mechanism to partially vary the stiffness of the vine 200.

The vine 200 according to the present disclosure made of the hyper elastic material as described above may immediately solve the above problem. First, the present disclosure suggests that the entire pressure of the robot may be gradually relieved by evacuating air from the tip space 240 in the robot. This pressure may lead to a critical pressure to expand or contract the tip 230. In addition, the contracted tip 230 is impossible to generate a large restoring force due to its small diameter, whereas the outer periphery 210 may maintain its diameter and stiffness to prevent its buckling while the inner periphery 220 is being pulled. This stiffness may prevent the buckling of the outer periphery 21 by the friction.

A payload of the soft growing robot may be very important for the soft growing robot to lift a heavy object or to support its own body or a tip mount. In addition, the payload may be usually limited by bending stiffness. As shown in FIG. 11, the soft growing robot according to the present disclosure may include the vine 200 made of the hyper elastic material, and the vine 200 may have bulging bifurcation and bending bifurcation due to its instability when swollen. In addition, when a greater pressure is generated therein, the bending bifurcation may transition into a bent bulging bifurcation. This bent bulging bifurcation may allow the vine 200 to maintain a curved shape while maintaining the pressure, without any external force. Accordingly, the vine 200 may have the locking characteristic. The vine may maintain its shape even when a moment in which the pressure is applied to the vine is over, and thus be grown by having various curvatures.

FIGS. 12 to 14 are views each showing a steering mechanism according to various exemplary embodiments according to the present disclosure: FIG. 12 is a view showing a stiffness adjuster-type steering mechanism according to a first exemplary embodiment of the present disclosure; FIG. 13 is a view showing a tendon-type steering mechanism according to a second exemplary embodiment of the present disclosure; and FIG. 14 is a view showing a mount-type steering mechanism according to a third exemplary embodiment of the present disclosure. The soft growing robot according to the present disclosure may further include various types of a steering mechanism 500 that controls a growth direction of the vine 200, and the following description exemplary describes the various types of steering mechanisms 500.

Referring to FIG. 12, the outer periphery 210 may be divided into a plurality of peripheries including a first outer periphery 211 and a second outer periphery 212 in its circumferential direction, and each periphery may include an outer wall, an inner wall and a void formed between the outer wall and the inner wall. Here, the first outer periphery 211 may include a first outer wall 211a, a first inner wall 211b and a first void 211c formed therebetween, and the second outer periphery 212 may include a second outer wall 212a, a second inner wall 212b and a second void 212c formed therebetween. In addition, the steering mechanism 500 may include a stiffness adjuster 510 adjusting the plurality of voids including the first void 211c and the second void 212c by different pressures and the stiffness adjuster 510 may adjust the stiffness of each outer periphery 210. Here, when the fluid is injected into the tip space 240 of the vine 200, the growth direction of the vine 200 may be controlled to face the outer periphery 210 having a void having a relatively low pressure among the plurality of outer peripheries 210. In addition, a growth angle of the vine may also be controlled by a difference between the pressures in the plurality of voids including the first void 211c and the second void 212c.

Referring to FIG. 13, the steering mechanism 500 may include a plurality of tendons 520 inserted into the outer periphery 210 of the vine 200. Here, the plurality of tendons 520 may be spaced apart from each other in the circumferential direction of the outer periphery 210, and the growth direction of the vine 200 may be controlled by allowing the tendon 520 to be grown together, or clamping or retracting the tendon 520. That is, when some of the plurality of tendons 520 are clamped or retracted when the vine 200 is grown, a front end of the vine 200 may be adjusted to be bent in the corresponding direction.

Referring to FIG. 14, the steering mechanism 500 may include a mount 530 disposed in the tip space 240 of the vine 200, and the mount 530 may include a through hole 531 into which the inner periphery 220 of the vine 200 is inserted. In addition, one end of a fixing part 532 may be connected to the mount 530, and the other end of the fixing part 532 may be in contact with an inner surface of any one of the tip 230, bent portion 250 and outer periphery 210 of the vine 200. More preferably, the other end of the fixing part 532 may be in contact with the inner surface of the bent portion 250, which is the stretching region, to limit the growth of the corresponding portion, thereby controlling the growth direction of the vine 200 to be turned. The fixing part 532 may be used separately from the mount 530, and may be a member which may be taped to the mount 530 to be detachably attached thereto limit the growth of the vine 200 in one direction. Here, the vine of the soft growing robot according to the present disclosure may have a locked shape by its characteristic of the hyper elastic material even when the fixing part 532 is separated therefrom after the growth direction of the vine is turned by the fixing part 532.

FIGS. 15 and 16 are views each showing centers of the vines according to the present disclosure and the prior art.

Referring to FIGS. 15 and 16, the vine 200 of the soft growing robot 10 according to the present disclosure may have a cylindrical center 221 because the inner periphery 220 has the pressure equal to the wall tension of the hyper elastic material. This the center 221 may allow the robot of the present disclosure to more easily secure an internal channel than a conventional growing robot 20 having a vine 21 of which the inner periphery 22 has a crooked center 23 because the center 23 and the tip space 24 are required to have the same pressures PI and PO as each other. Accordingly, the soft growing robot 10 according to the present disclosure may have a more effectively arrange or smoothly control a data collection unit 600 including a cable 610 and a sensing module 620. Here, the sensing module 620 may be connected to the cable 610 to obtain external information.

FIGS. 17 to 19 are views each showing a cover according to various exemplary embodiments according to the present disclosure: FIG. 17 is a view showing an unfolded-type cover according to a fourth exemplary embodiment of the present disclosure; FIG. 18 is a view showing an everted-type cover according to a fifth exemplary embodiment of the present disclosure; and FIG. 19 is a view showing a shared growth-type cover according to a sixth exemplary embodiment of the present disclosure. The soft growing robot according to the present disclosure may include the vine 200 made of the hyper elastic material, and thus burst by stress in the circumferential direction. The soft growing robot according to the present disclosure may thus further include various types of covers 700 to prevent bursting, and the following description exemplary describes the various types of covers 700.

Referring to FIG. 17, the cover 700 according to the present disclosure may include a cover body 710 stacked in a folded state and surrounding the outer periphery 210, tip 230 and bent portion 250 of the vine 200. Here, when the vine 200 is grown, the stacked cover body 710 may be unfolded and extended to continuously surround the grown vine 200 while being maintained to have a predetermined inner diameter.

Referring to FIG. 18, the cover 700 according to the present disclosure may include a cover body 710 stacked in a folded state and surrounding the outer periphery 210, tip 230 and bent portion 250 of the vine 200. In addition, when the vine 200 is grown, the stacked cover body 710 may be unfolded to be everted and continuously surround the grown vine 200.

Referring to FIG. 19, the cover 700 according to the present disclosure may include a cover body 710 surrounding the outer periphery 210, tip 230 and bent portion 250 of the vine 200, and an insertion 720 disposed in the center 221 formed by the inner periphery 220 of the vine 200. Accordingly, when the inner periphery 220 of the vine 200 is everted, the insertion 720 may also be everted together, thereby continuously surrounding the grown vine 200.

As described above, the present disclosure is described with reference to the specific matter such as the specific components, the specific exemplary embodiments and the drawings, which are provided only for assisting in the general understanding of the present disclosure. Therefore, the present disclosure is not limited to the exemplary embodiments. Various modifications and changes may be made by those skilled in the art to which the present disclosure pertains from this description. Some exemplary embodiments may be mixed with each other, or some components of each exemplary embodiment may be mixed with each other.

Therefore, the spirit of the present disclosure should not be limited to these exemplary embodiments, and the claims and all of the modifications equal or equivalent to the claims are intended to fall within the scope and spirit of the present disclosure.

What is claimed is:

1. A soft growing robot comprising:
   a case having one open side; and
   a vine including
      an outer periphery having one end fixed to one side surface of the case,
      an inner periphery disposed inside the outer periphery while being spaced apart from the outer periphery and extended into the case,
      a tip connecting another end of the outer periphery and one end of the inner periphery to each other, and
      a tip space formed by the outer periphery, the tip, and the inner periphery, wherein
   an inner end of the tip is extended from the one end of the inner periphery having a same diameter with a diameter of the inner periphery, and
   a diameter of an outer surface of the tip is smaller than a diameter of the outer periphery, thereby forming a bent portion between the tip and the outer periphery.
2. The soft growing robot of claim 1, further comprising a pressure controller that controls a pressure in the tip space.
3. The soft growing robot of claim 2, wherein the vine is made of a hyper elastic material.
4. The soft growing robot of claim 3, wherein the vine has the tip space formed by a first pressure during its growth, and then has its growth state controlled by a second pressure lower than the first pressure.
5. The soft growing robot of claim 1, wherein the vine is made of a hyper elastic material, and the tip has an increased growth length when the vine is grown.
6. The soft growing robot of claim 1, wherein the vine is made of a hyper elastic material, the vine includes a stretching region bent between the tip and the outer periphery, and the tip or the stretching region is bulged to expand the outer periphery when the vine is grown.
7. The soft growing robot of claim 1, wherein the vine is made of a hyper elastic material, and an everting region in which the tip is disposed is reduced when the vine is grown.
8. The soft growing robot of claim 1, further comprising a feeder connected to another end of the inner periphery of the vine to control an entire length of the vine.
9. The soft growing robot of claim 1, further comprising a steering mechanism that controls a growth direction of the vine.
10. The soft growing robot of claim 9, wherein the outer periphery of the vine includes a plurality of voids disposed in a circumferential direction thereof, and the steering mechanism controls the plurality of voids by pressures different from each other.
11. The soft growing robot of claim 10, wherein when fluid is injected into the tip space, the growth direction of the vine is changed to face a void having a relatively low pressure among the plurality of voids.
12. The soft growing robot of claim 9, wherein the outer periphery of the vine includes an outer wall, an inner wall and the void between the outer wall and the inner wall.
13. The soft growing robot of claim 9, wherein the steering mechanism includes a plurality of tendons inserted into the outer periphery of the vine.
14. The soft growing robot of claim 9, wherein the steering mechanism includes one or more fixing parts that limit expansion of a specific portion of the vine.
15. The soft growing robot of claim 14, wherein the steering mechanism includes a mount inserted into the tip space in the tip and including a through hole into which the inner periphery of the vine is inserted, one end of the fixing part is connected to the mount, and another end of the fixing part is in contact with and fixed to the vine.
16. The soft growing robot of claim 15, wherein the bent portion is formed between the tip and the outer periphery, and the other end of the fixing part is in contact with the bent portion.
17. The soft growing robot of claim 14, wherein the fixing part is in contact with an outer surface of the vine to limit the expansion of the vine.
18. The soft growing robot of claim 1, further comprising a cover surrounding an outer circumferential surface of the vine.
19. The soft growing robot of claim 18, wherein when the vine is grown, the cover disposed in a folded state is unfolded.
20. The soft growing robot of claim 18, wherein the cover is partially inserted into a center formed by the inner periphery of the vine.

* * * * *